US006653932B1

(12) United States Patent
Beamish et al.

(10) Patent No.: US 6,653,932 B1
(45) Date of Patent: Nov. 25, 2003

(54) SYSTEM AND METHOD FOR ACHIEVING WIRELESS COMMUNICATIONS COVERAGE IN A LOCAL AREA

(75) Inventors: Norman J. Beamish, Costa Mesa, CA (US); Robert S. Saunders, Irvine, CA (US); John S. Walley, Lake Forest, CA (US); Raymond Hon Mo Yung, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/409,297

(22) Filed: Sep. 29, 1999

(51) Int. Cl.[7] .............................................. H04M 11/04
(52) U.S. Cl. ............................. 340/310.01; 340/310.06
(58) Field of Search ........................ 340/310.01, 310.06, 340/310.08, 310.02, 825.72, 825.69; 455/3.03, 3.05, 3.01

(56) References Cited

U.S. PATENT DOCUMENTS

| 4,980,665 A | * | 12/1990 | Schotz ................... 340/310.02 |
| 5,481,249 A | * | 1/1996 | Sato .......................... 340/2.1 |
| 5,565,855 A | * | 10/1996 | Knibbe ...................... 340/3.51 |
| 5,905,442 A | * | 5/1999 | Mosebrook et al. ......... 340/3.7 |
| 6,151,480 A | * | 11/2000 | Fischer et al. ......... 340/310.01 |
| 6,175,860 B1 | * | 1/2001 | Gaucher ...................... 709/208 |
| 6,229,433 B1 | * | 5/2001 | Rye et al. .............. 340/310.01 |
| 6,492,897 B1 | * | 12/2002 | Mowery, Jr. ........... 340/310.01 |

OTHER PUBLICATIONS

News Release, "Intelogis announces high-speed data transmission breakthrough in powerline networking technology," fournd at the following web location: http://www.intelogis-.com/news/021099.com (Sep. 14, 1999).

Intelogis PLUG-IN™Technology Power Line Communications, White Paper, found at the following web location: http://www.Intelogis.com (11/98).

* cited by examiner

*Primary Examiner*—Nina Tong
(74) *Attorney, Agent, or Firm*—Farjami & Farjami LLP

(57) ABSTRACT

An electrical apparatus which is configured with an antenna, transceiver, or repeater for transmission or reception over a wireless interface. In one embodiment, the appliance interfaces to a user device through a system which includes the power distribution system of the apparatus. In another embodiment, the apparatus, optionally in combination with a user device, forms a node of a wireless communication system.

21 Claims, 20 Drawing Sheets

SYSTEM AND METHOD FOR ACHIEVING WIRELESS COMMUNICATIONS COVERAGE IN A LOCAL AREA

BACKGROUND OF THE INVENTION

The present invention is directed to the field of wireless communications. In particular, the present invention is directed to the field of wireless communications in a local area, such as a home or office.

The Industrial, Scientific and Medical (ISM) frequency spectrum is a part of the electromagnetic spectrum that has traditionally been reserved for industrial, scientific or medical applications. Three of the bands within the ISM spectrum are the A band, 902–928 MHz; the B band, 2.4–2.484 GHz; and the C band, 5.725–5.875 GHz. In 1995, the Federal Communication Commission (FCC) expanded the applications for the ISM band to permit the use of low-power transceivers. Today, many in-home wireless communications devices operate in this band, including wireless LANs, cordless telephones, cable-less headphones, door-chimes, garage door openers, TV/VCR/stereo remote control units, baby-phones, etc. Moreover, outdoor devices such as car alarms and automatic door locks operate in this spectrum. The FCC has established that no one may enjoy an exclusive right to any portion of the ISM spectrum. Thus, systems using this spectrum are subject to interference by other systems, potentially degrading the performance of these systems. Techniques for multiple access in the ISM spectrum exist, including direct sequence spread spectrum and frequency hopping spread spectrum techniques. In many applications, however, such techniques are too expensive or otherwise infeasible for use in a local area such as a home or office.

Despite the potential for mutual interference, wireless systems for the home and office environment that use the ISM spectrum continue to be developed and marketed. Because they operate in the ISM spectrum, the systems are generally insensitive to or can sustain some level of mutual interference. However, because of the potential for mutual interference, transmission power is often lowered, thereby reducing the coverage area. Thus, in such systems, one of the critical issues is the coverage area inside and around the home or office.

In achieving coverage of a local area, the number, power and positioning of the transceivers/antennas must be considered. Tradeoffs must often be made between coverage and cost. For example, as the radiating power of a transceiver is reduced, the lower its cost but also the less its coverage. The positioning of the transceiver or antenna within a home or office thus becomes critically important. Moreover, the task of positioning the transceivers or antennas can itself be costly and time-consuming.

Typically, an empirical trial-and-error process ensues, in which the transceivers or antennas are repeatedly positioned and coverage tested until adequate coverage is achieved. Alternatively, a large number of transceivers or antennas are positioned in a local area to guarantee adequate coverage. A third option is simply to install a high-power transceiver, i.e., 100 mW or more, to achieve adequate coverage. Such high-power transceivers, however, are typically too large and expensive for use in a home or office. They also tend to compound the mutual interference problem.

Similarly, it is difficult to achieve adequate coverage in a home or office using low power transceivers. The desired coverage area often includes multiple rooms separated by interior walls. Interior walls force either an increase in transceiver power requirements or an increase in the number of transceivers, the latter to achieve line-of-sight coverage. Transceiver or antenna positioning may be customized for each home or office, but customization only increases the cost. In sum, current wireless solutions are either prohibitively expensive, subject to mutual interference, or achieve inadequate coverage.

Recently, technology has been announced in which data transmission can occur over AC power lines in a home or office. See www.interlogis.com. However, this is still a wired technology, and hence is subject to the mobility limitations, coverage restrictions, and cabling requirements of wired systems.

Hence, there is a need for a system and method for achieving wireless communications coverage in a local area which achieves adequate coverage, is not prohibitively expensive, and which otherwise overcomes the disadvantages of the prior art.

SUMMARY OF THE INVENTION

In accordance with the purpose of the invention as broadly described herein, there is provided an electrical apparatus configured in various embodiments to include an antenna, a transceiver, or a repeater. In one embodiment, the apparatus comprises: a power distribution system for distributing power to the apparatus and for carrying a first signal relating to a second signal, the second signal for receiving or transmitting over a wireless interface; and an antenna coupled to the power distribution system for receiving or transmitting the second signal over a wireless interface.

In a second embodiment, the apparatus comprises a power distribution system for distributing power to the apparatus; and a transceiver coupled to the power distribution system for receiving or transmitting over a wireless interface a first signal relating to a second signal, the second signal for carrying over the power distribution system.

In a third embodiment, the apparatus comprises a power distribution system for distributing power to the apparatus; and a repeater for repeating a signal received over a wireless interface.

A fourth embodiment comprises a wireless communication system including a plurality of nodes configured to communicate with one another over a wireless interface, wherein at least one of the nodes comprises the apparatus of the foregoing first embodiment coupled to a user device through a power distribution system. The power distribution system is configured to carry the first signal which relates to the second signal, the second signal for transmitting or receiving over the wireless interface.

A fifth embodiment comprises a wireless communication system including a plurality of nodes configured to communicate with one another over a wireless interface, wherein at least one of the nodes comprises the apparatus of the foregoing second embodiment coupled to a user device through a power distribution system. The power distribution system is configured to carry the second signal from which is derived the first signal as transmitted over the wireless interface, or which is derived from the first signal as received over the wireless interface.

A method of operation of an electrical apparatus configured in accordance with the subject invention comprises: receiving a first signal over a wireless interface; and transmitting a second signal derived from the first signal to a user over the power distribution system of the apparatus.

A second such method comprises: providing a first signal over the power distribution system of the apparatus; and transmitting a second signal derived from the first over a wireless interface.

A third such method comprises: receiving a signal over a wireless interface; demodulating the signal to baseband frequencies; and providing the demodulated signal to a user over a power distribution system.

A fourth such method comprises: receiving a signal at baseband frequencies from a user; providing the signal to a modulator over a power distribution system; modulating the signal to a desired carrier frequency; and transmitting the modulated signal over a wireless interface.

In any and each of the foregoing embodiments, the first signal may be the second signal, or it may be different from the second signal.

DETAILED DESCRIPTION OF THE PREFERRED EMBODIMENTS

Figure 1A:
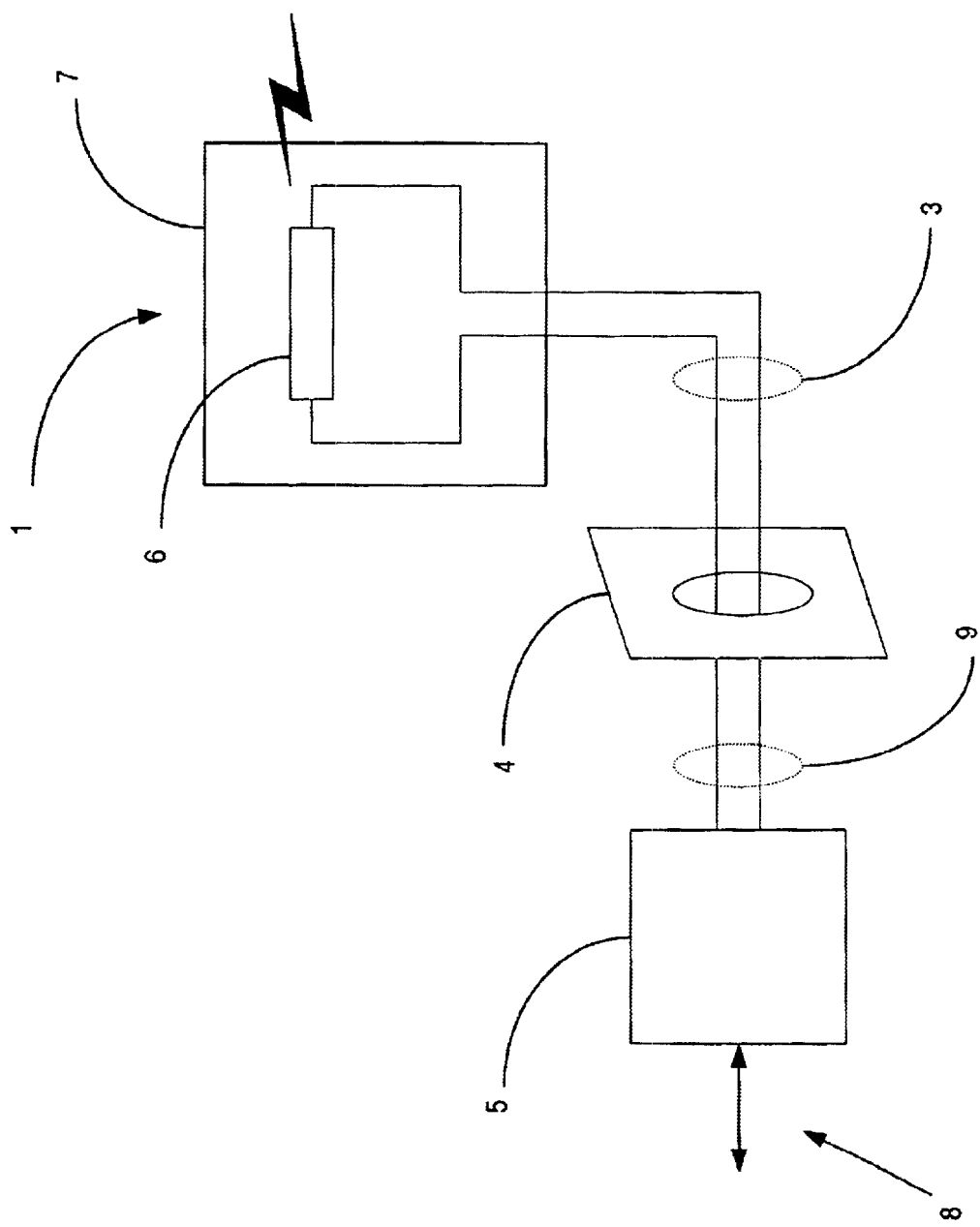
FIG. 1A illustrates a first embodiment of the subject invention.

A first embodiment 1 of the subject invention is illustrated in FIG. 1A. As illustrated, the first embodiment comprises an electrical appliance 7 configured with an antenna 6. In one implementation, antenna 6 is a radiator configured for the ISM spectrum. In another implementation, the antenna is configured to handle RF or microwave frequencies including those outside the ISM spectrum. In one implementation example, the antenna has a form factor configured to achieve coverage in the ISM spectrum of a typical room, e.g., 15×15 ft.$^2$, in a home or office. Moreover, in one implementation, the gain of the antenna is such that, as part of a typical transceiver, the radiated power from the antenna is between about 0.1 to about 10 milliwatts (mW), and advantageously about 1 mW. In one implementation example, the antenna is a generally isotropic antenna or has a generally spherical radiation pattern.

A/C power lines 3 provide power to the electrical appliance. In one implementation, the electrical appliance is a light fixture or the like which is hard-wired into a home or office, and A/C power lines 3 are part of the power distribution system pre-wired within the home or office. In another implementation, the electrical appliance is a plug-in device such as a desk lamp or the like, and the A/C power lines 3 are the A/C power cord of the electrical appliance which is plugged into wall socket or outlet 4.

Optionally, a user device 5 is coupled to the electrical appliance 7 through the A/C power lines 9 of the device 5 in combination with the A/C power lines 3 of the electrical appliance. In one implementation, illustrated in FIG. 1A as supplemented by FIG. 1D, the A/C power lines 3 and 9 are coupled together by means of a wall socket 4 which interfaces between the two. In this implementation, A/C power lines 3 of the appliance 7 are pre-wired power distribution lines within a home or office. The wall socket 4 is provided for allowing other devices or appliances to plug into the power distribution system. The power distribution lines 3 are accessible through an outlet 4a. The A/C power lines 9 for the user device 5 plug into the outlet through plug 9a, thus achieving coupling between the lines 9 and the lines 3.

Figure 1B:
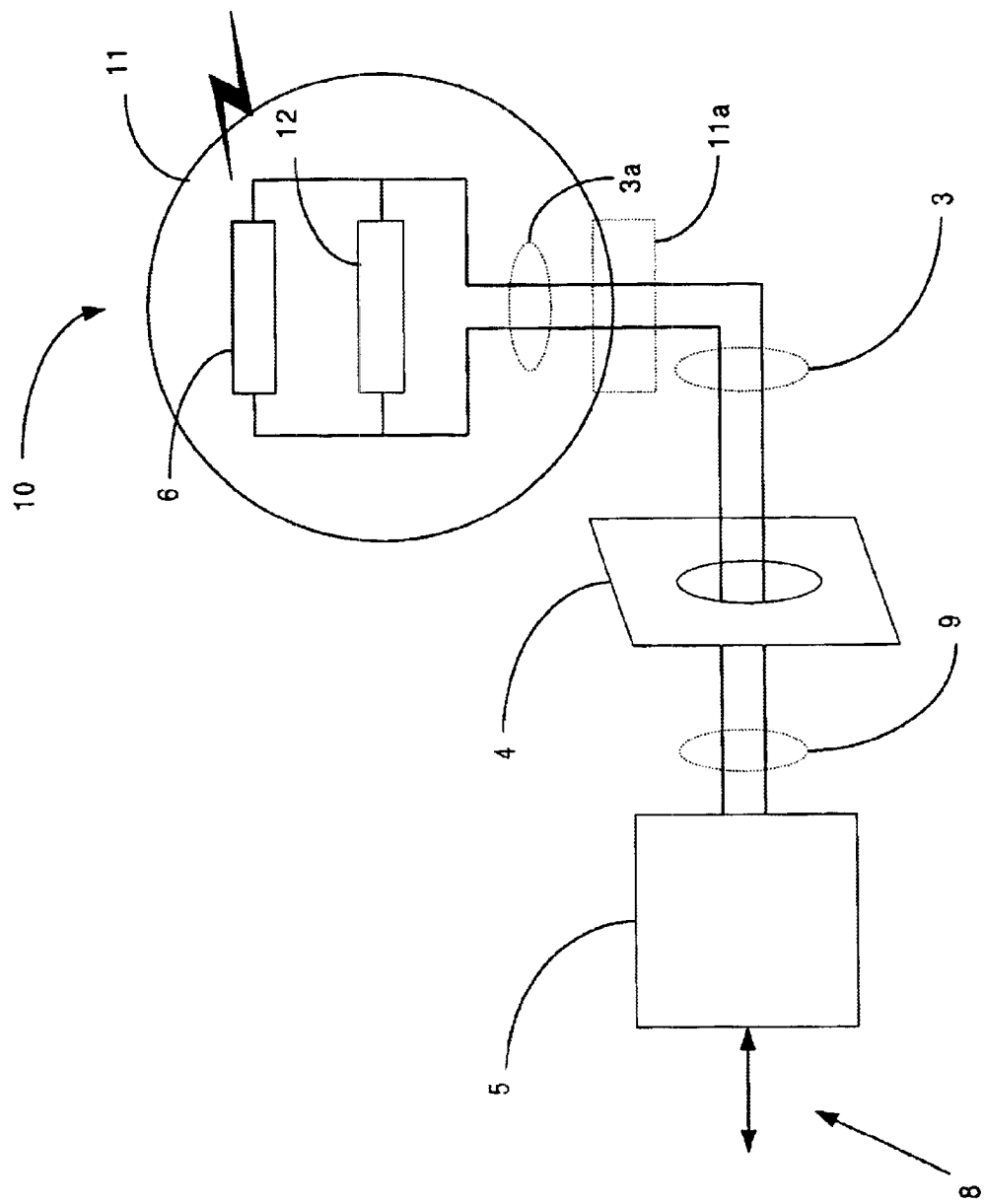
FIGS. 1B–1G illustrate implementations of the first embodiment of the subject invention.
Figure 1C:
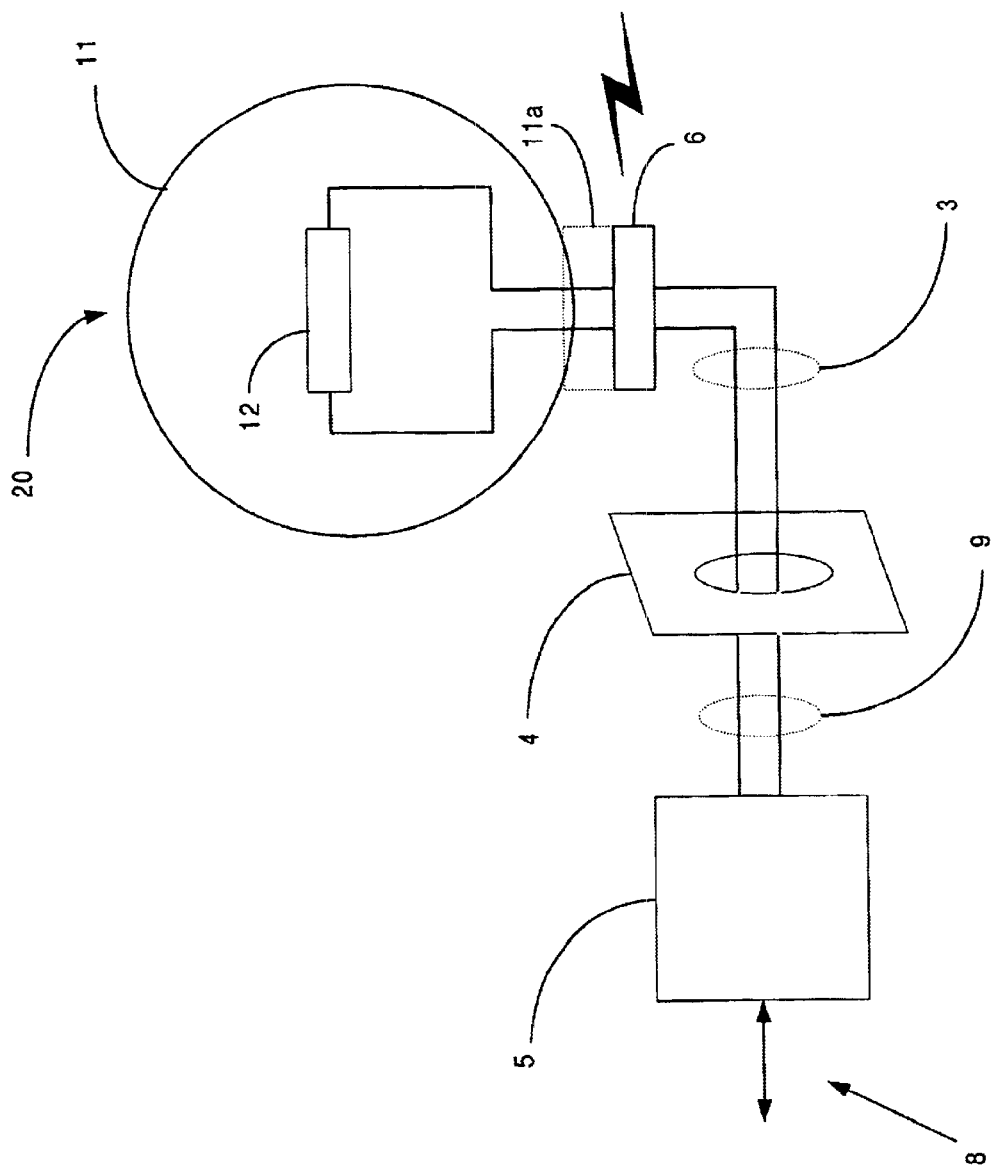
Figure 1D:
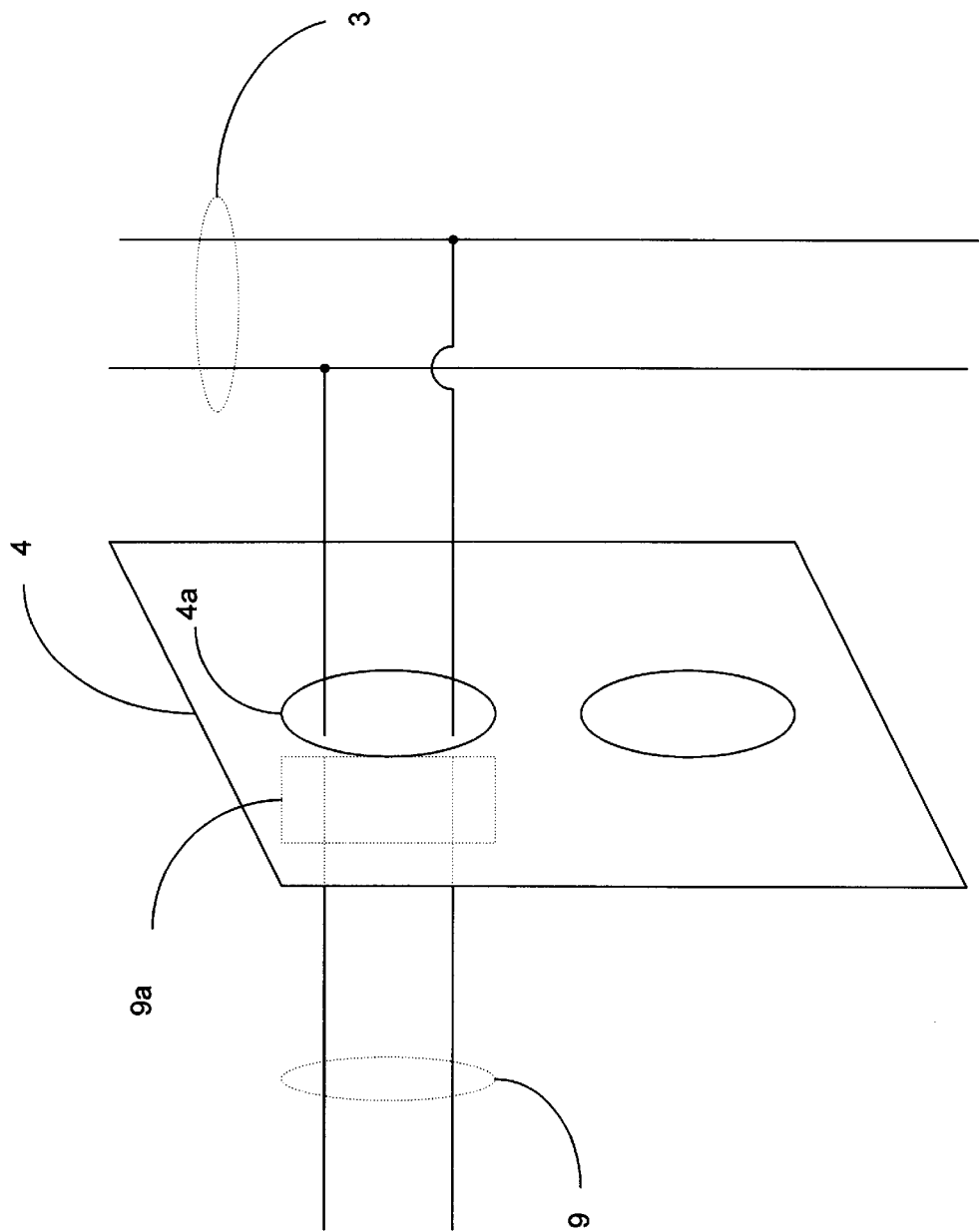
Figure 1E:
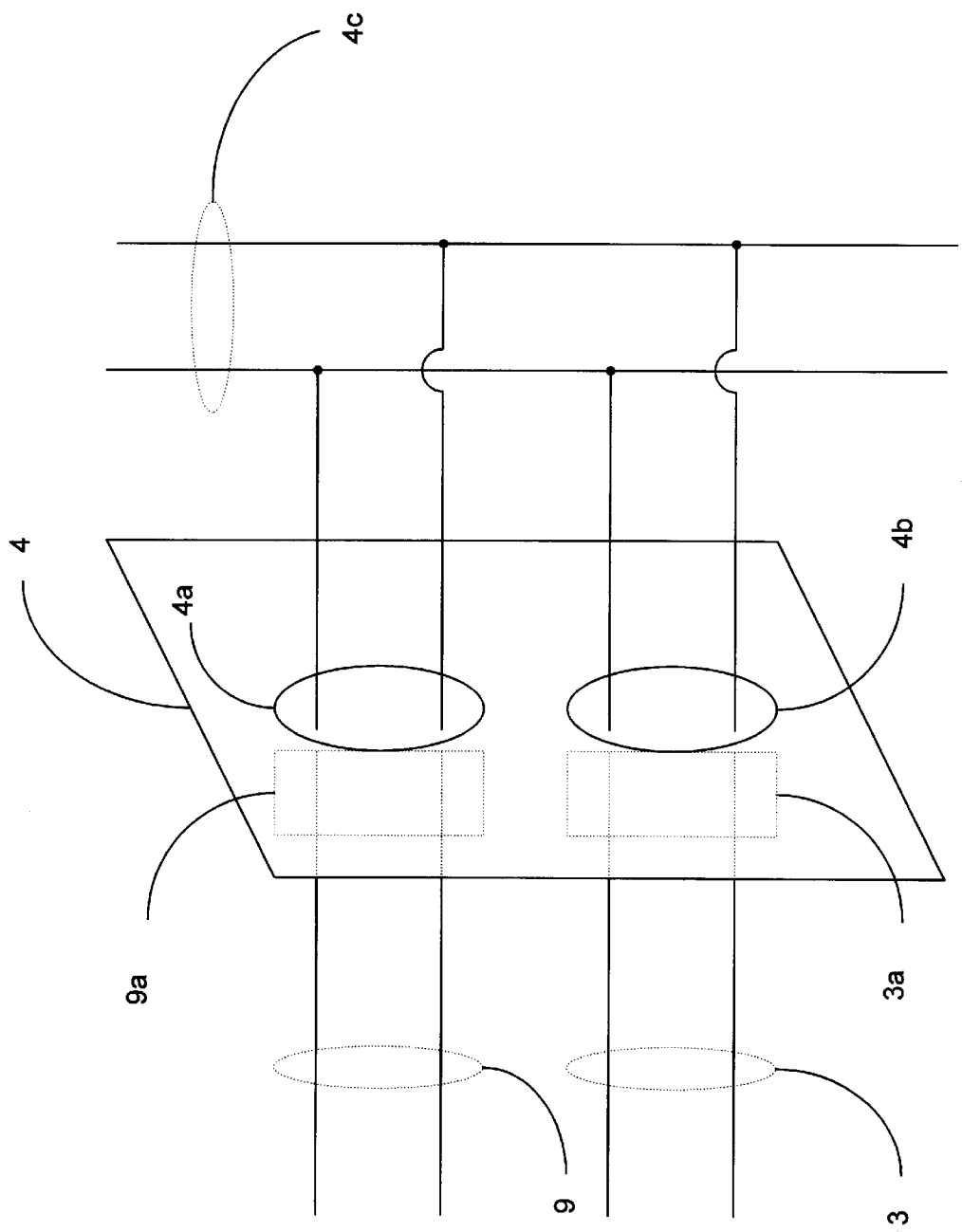

In a second implementation, illustrated in FIG. 1A as supplemented by FIG. 1E, the appliance 7 is a plug-in appliance, and the A/C power cord 3 for the device is plugged into outlet 4b of wall socket 4 through plug 3a. User device 5 is also a plug-in device, and the A/C power cord 9 for this device is plugged into outlet 4a of wall socket 4 through plug 9a. Both outlets 4a and 4b are coupled to and provide access to the pre-wired power distribution system 4c for the home or office. Thus, A/C power lines 3 and 9 are coupled together by virtue of user device 5 and electrical appliance 9 being plugged into the wall socket 4.

Figure 1F:
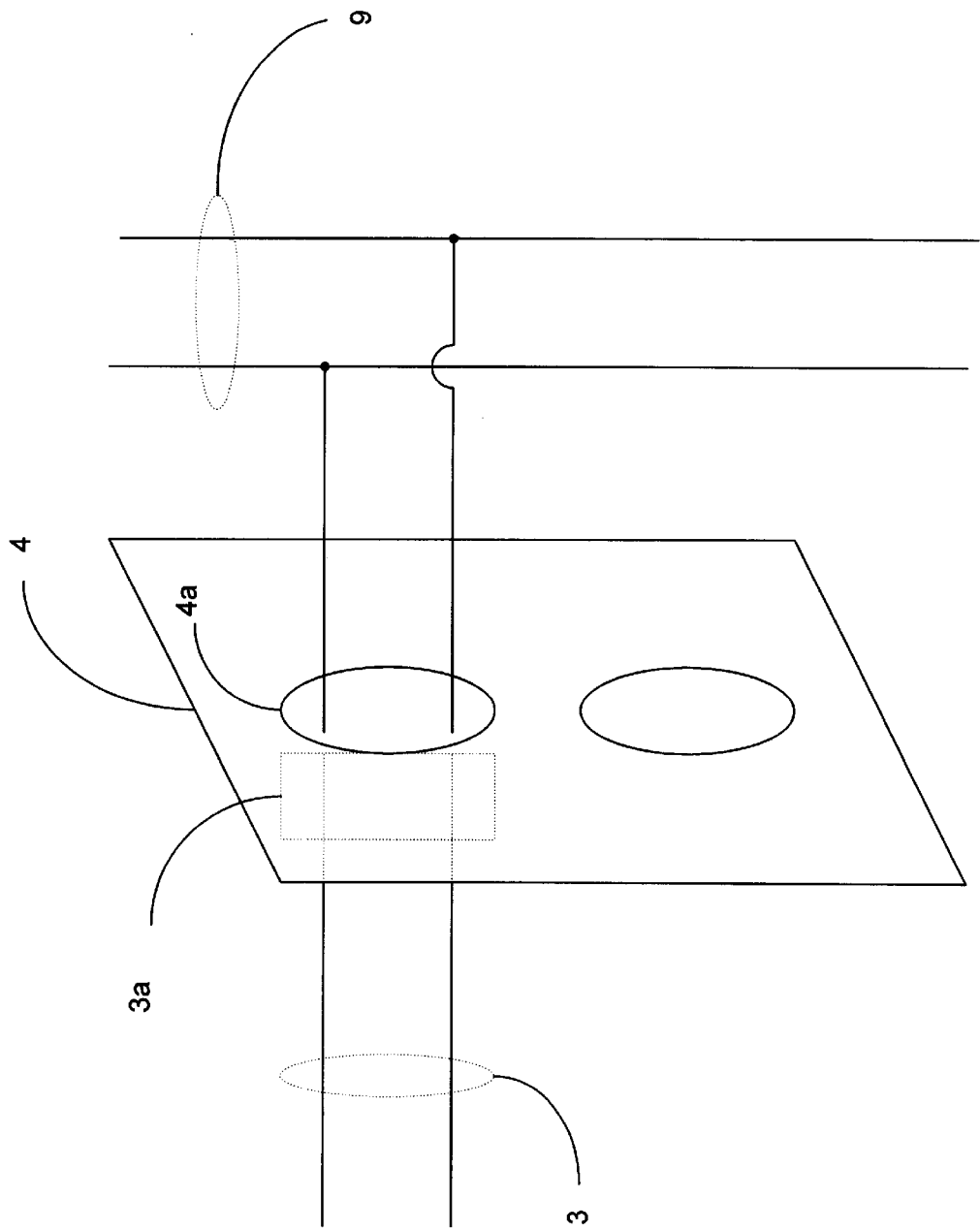

In a third implementation, illustrated in FIG. 1A as supplemented by FIG. 1F, user device 5 is hard-wired into the power distribution system of the home or office, and electrical appliance 7 is a plug-in device. In accordance with the foregoing, the A/C power lines 9 for the user device 5 are part of the pre-wired power distribution system of the home or office, and the A/C power cord 3 for the appliance is coupled to the power distribution system, and to A/C power lines 9, through outlet 4a of wall socket 4.

Figure 1G:
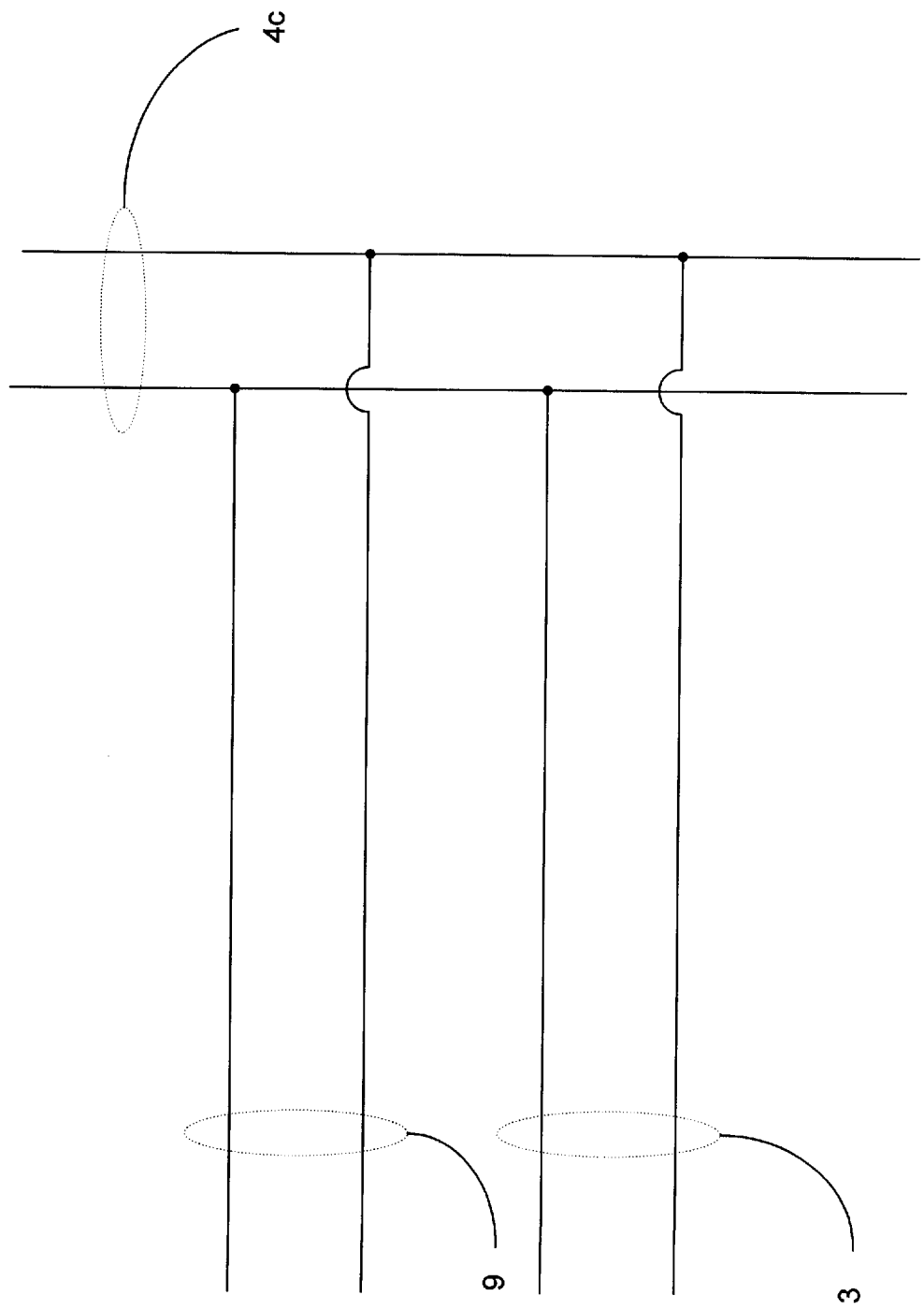

In a fourth implementation, illustrated in FIG. 1A as supplemented by FIG. 1G, both user device 5 and electrical appliance 9 are hard-wired into the power distribution system 4c for the home or office. Other implementations are possible in which the A/C power lines 3 and 9 are coupled together by means other than a wall socket or outlet.

With reference to FIG. 1A, the user device 5 includes a user interface for interacting with a user, and allowing the user to input commands and/or information 8 over the user interface. Responsive to these commands/information 8, user commands and/or information, the latter in the form of either voice or data, is communicated with antenna 6. In the embodiment of FIG. 1A, user device 5 includes a transceiver for modulating user information onto a signal at the carrier frequency, and placing the modulated signal onto the A/C power lines 9 of the device, whereby the modulated signal is superimposed onto the 50–60 Hz power signal which is used to power the device 5 and appliance 7, and transmitted to the antenna 6 over A/C power lines 9 and 3. At that point, the signal is transmitted out over a wireless interface to another device or appliance through antenna 6.

In the case in which a modulated signal is received by antenna 6 over a wireless interface from another device or appliance, the modulated signal is transmitted to user device 5 over the A/C power lines 3 and 9. The transceiver in the device 5 is configured with suitable means to separate the modulated signal from the power signal used to power the device 5 and appliance 9, to isolate the separated signal from the power signal, and to demodulate the signal to baseband frequencies. This transceiver may also be configured with means to bandlimit the modulated signal, and to amplify it. The information in the baseband signal may then be communicated to the user through the user interface.

In one implementation, the means for separating the modulated signal from the power signal includes a band pass filter which has a corner frequency between the carrier frequency of the modulated signal and the relatively low (50–60 Hz) frequency of the power signal. Additional detail about transmitting information over the power distribution system of a home or office is available at www.interlogis.com, which is hereby fully incorporated by reference herein as though set forth in full.

In one implementation, the transceiver and antenna 6 are suitably configured such that the carrier frequency of the signal transmitted and received over the wireless interface is within the ISM spectrum. In another implementation, the transceiver and antenna 6 are suitably configured such that the carrier frequency of the signal transmitted and received over the wireless interface is an RF or microwave frequency which may be outside the ISM spectrum. In a third implementation, the carrier frequencies for transmission and reception over the wireless interface are different. In one example of this implementation, the carrier frequency for the transmit signal is within the ISM spectrum, but that for the receive signal is outside the ISM spectrum. In another example, the reverse is the case. In a fourth implementation, both carrier frequencies are within the ISM spectrum but spaced to allow full duplex communication.

An implementation 10 of the first embodiment of the subject invention is illustrated in FIG. 1B in which, compared to FIG. 1A, like elements are referenced with like identifying numerals. In FIG. 1B, the antenna 6 is integrated within a light bulb 11. As shown, the light bulb 11 includes a threaded terminal 11a for screwing into an electrical outlet (not shown) for the appliance, thus coupling the power distribution system 3a for the light bulb to the A/C power lines or cord 3 for the appliance.

The antenna 6 is coupled to the power distribution system 3a in parallel with a filament 12 of the light bulb. In operation, the power distribution system 3a provides power to the filament 12, which radiates illumination responsive thereto. At the same time, power distribution system 3a, in combination with lines 3 and 9, may communicate a signal received by antenna 6 over the wireless interface to user device 5, and may also communicate a modulated signal provided by user device 5 to antenna 6 for transmission over the wireless interface.

FIG. 1C illustrates a second implementation 20 of the first embodiment of the subject invention in which, relative to FIG. 1B, like elements are referenced with like identifying numerals. In this implementation, antenna 6 is retrofitted to an existing light bulb 11. In contrast, the implementation of FIG. 1B may require remanufacturing of the light bulb to allow incorporation therein of the antenna 6. In the example illustrated in FIG. 1C, the antenna 6 is retrofitted to the end of threaded terminal 11a, but it should be appreciated in practice that other implementations are possible. According to one approach, the antenna 6 is encapsulated within an adapter which is situated between an ordinary light bulb and the A/C socket for the bulb. The adapter functions as both an antenna and an A/C bypass.

Figure 2A:
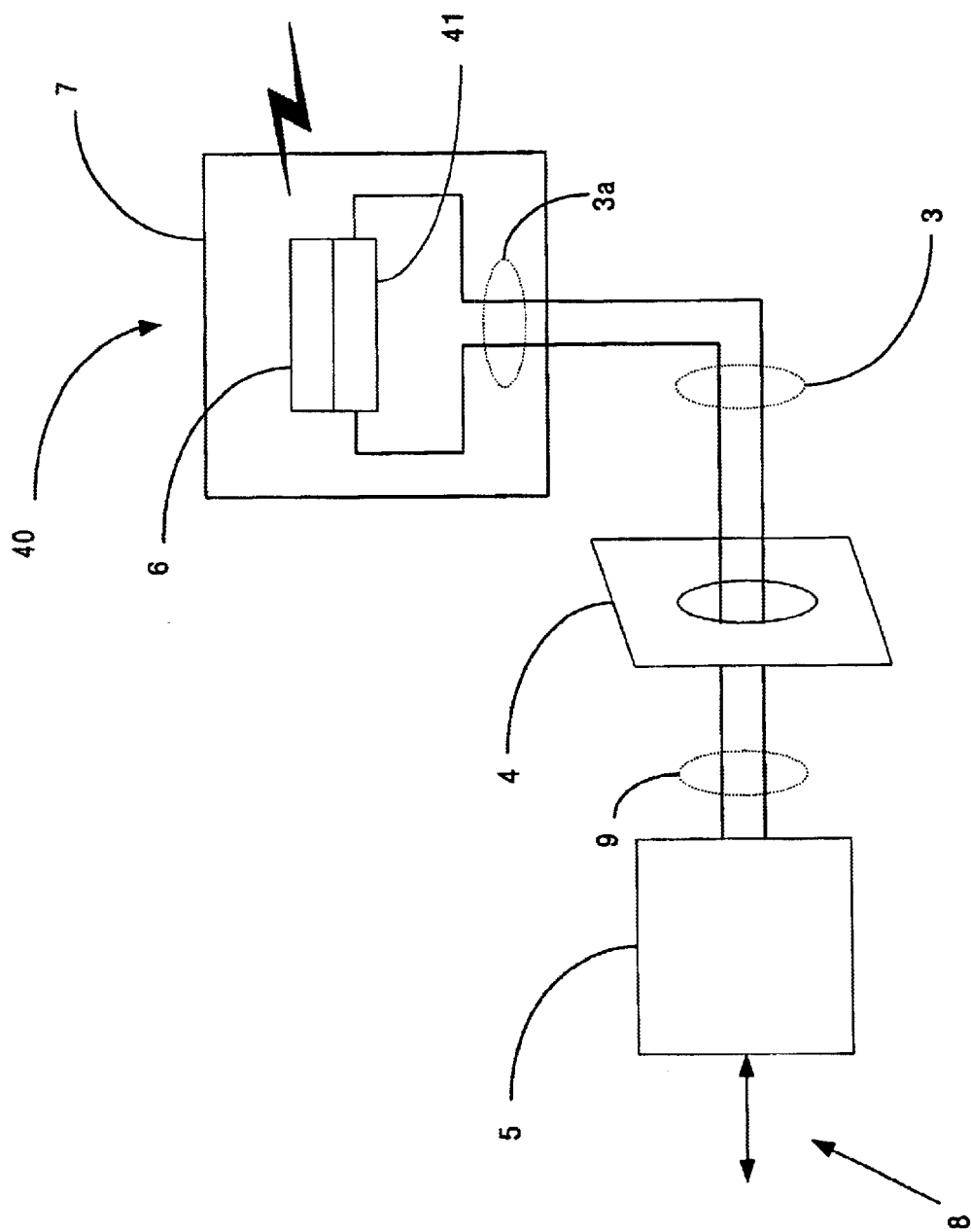
FIG. 2A illustrates a second embodiment of the subject invention.

FIG. 2A illustrates a second embodiment 40 of the subject invention in which, compared to FIG. 1A, like elements are referenced with like identifying numerals. As illustrated, in the second embodiment, a module 41 is integrated with the antenna 6 to form a transceiver within electrical appliance 7. The transceiver is coupled to A/C power lines 3a.

In a receive mode of operation, a signal is received over the wireless interface by antenna 6, and provided to module 41. In module 41, the signal is demodulated to baseband frequencies. In addition, the signal may be bandlimited to the desired frequency range, amplified, and/or low-pass filtered. The baseband signal is then provided over A/C power lines 3a, 3, and 9 to user device 5.

In a transmit mode of operation, a baseband signal comprising user information and/or commands, whether in the form of voice or data, is transmitted from user device 5 over A/C power lines 9, 3 and 3a to module 41. In module 41, the baseband signal is modulated onto a carrier signal at the desired carrier frequency. In addition, the signal may be bandlimited to the desired range of frequencies, and amplified. The modulated signal is then transmitted over the wireless interface by antenna 6.

In one implementation, the frequency of transmission and frequency of reception are different to allow for full-duplex transmission. In one implementation example, both are within the ISM spectrum, but are spaced by a certain distance. In another implementation example, both are within the RF or microwave spectrum exclusive or inclusive of the ISM spectrum. In a third implementation example, one is within the ISM spectrum, and the other is within the RF or microwave spectrum inclusive or exclusive of the ISM spectrum. In another implementation, the frequencies of transmission and reception are about the same, and only half-duplex transmission is supported.

Figure 2B:
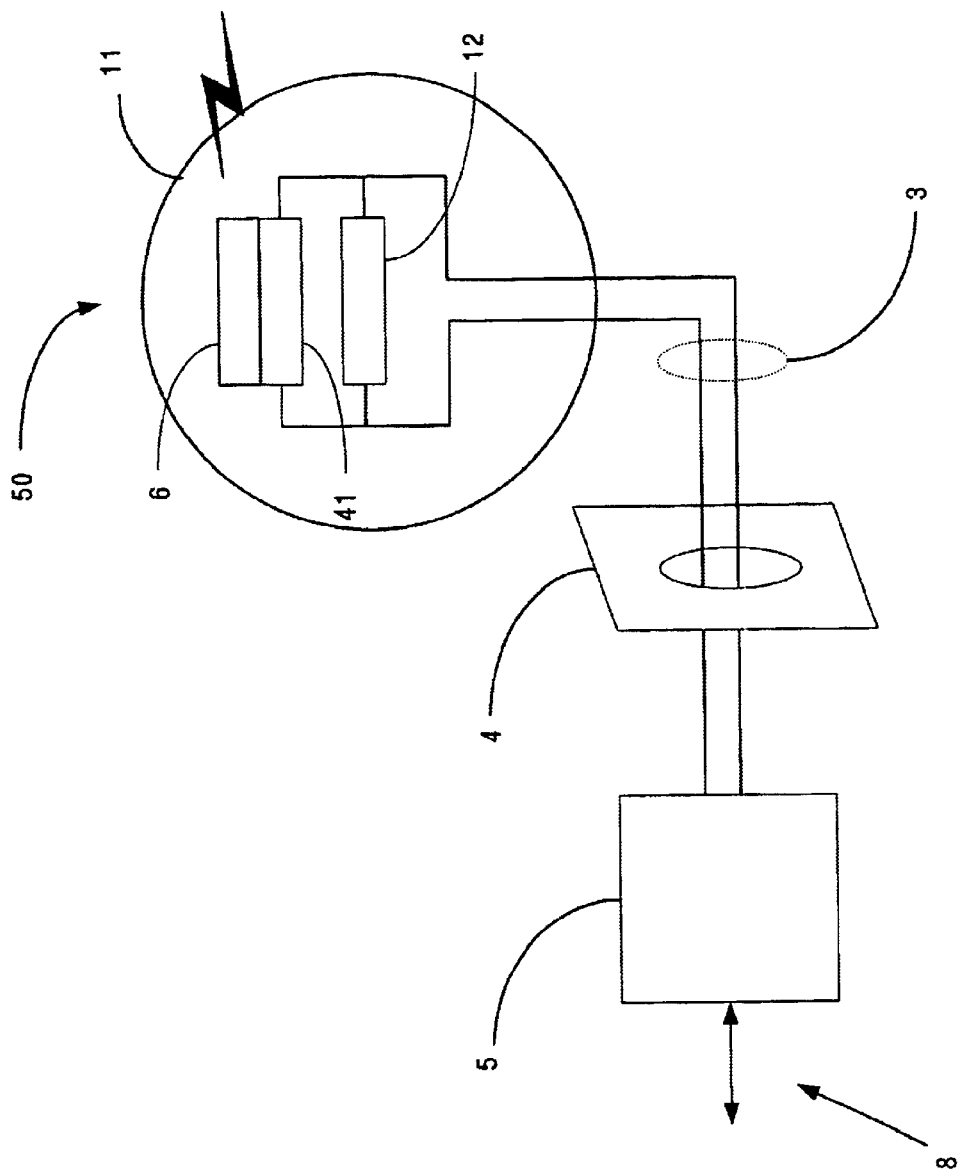
FIGS. 2B–2C illustrate implementations of the second embodiment of the subject invention.

One implementation 50 of the second embodiment is illustrated in FIG. 2B in which, compared to previous figures, like elements are referenced with like identifying numerals. In this implementation, electrical appliance 7 is a light bulb 11. As illustrated, in this implementation, the transceiver formed of antenna 6 and module 41 is coupled to the A/C power lines 3a in parallel with filament 12.

Figure 2C:
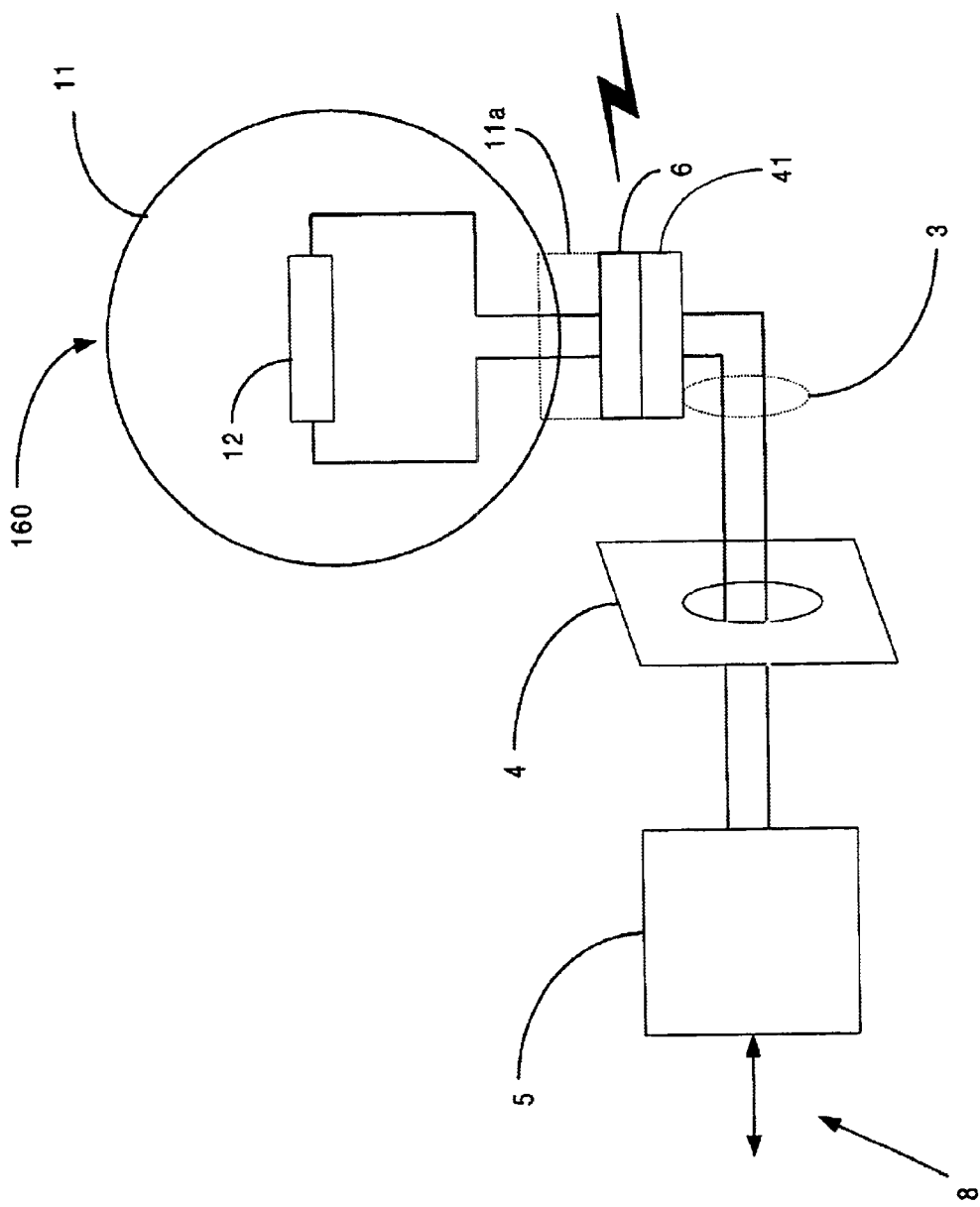

Another implementation 160 of the second embodiment is illustrated in FIG. 2C in which, compared to previous figures, like elements are referenced with like identifying numerals. In this implementation, electrical appliance 7 is again a light bulb 11 in which the transceiver formed of antenna 6 and module 41 is placed at the end of the threaded terminal 11a of the light bulb. The transceiver functions as described before, but in addition, it acts as a bypass for the A/C power lines 3a, which, as shown, extend through the transceiver and couple to the antenna 6.

Figure 2D:
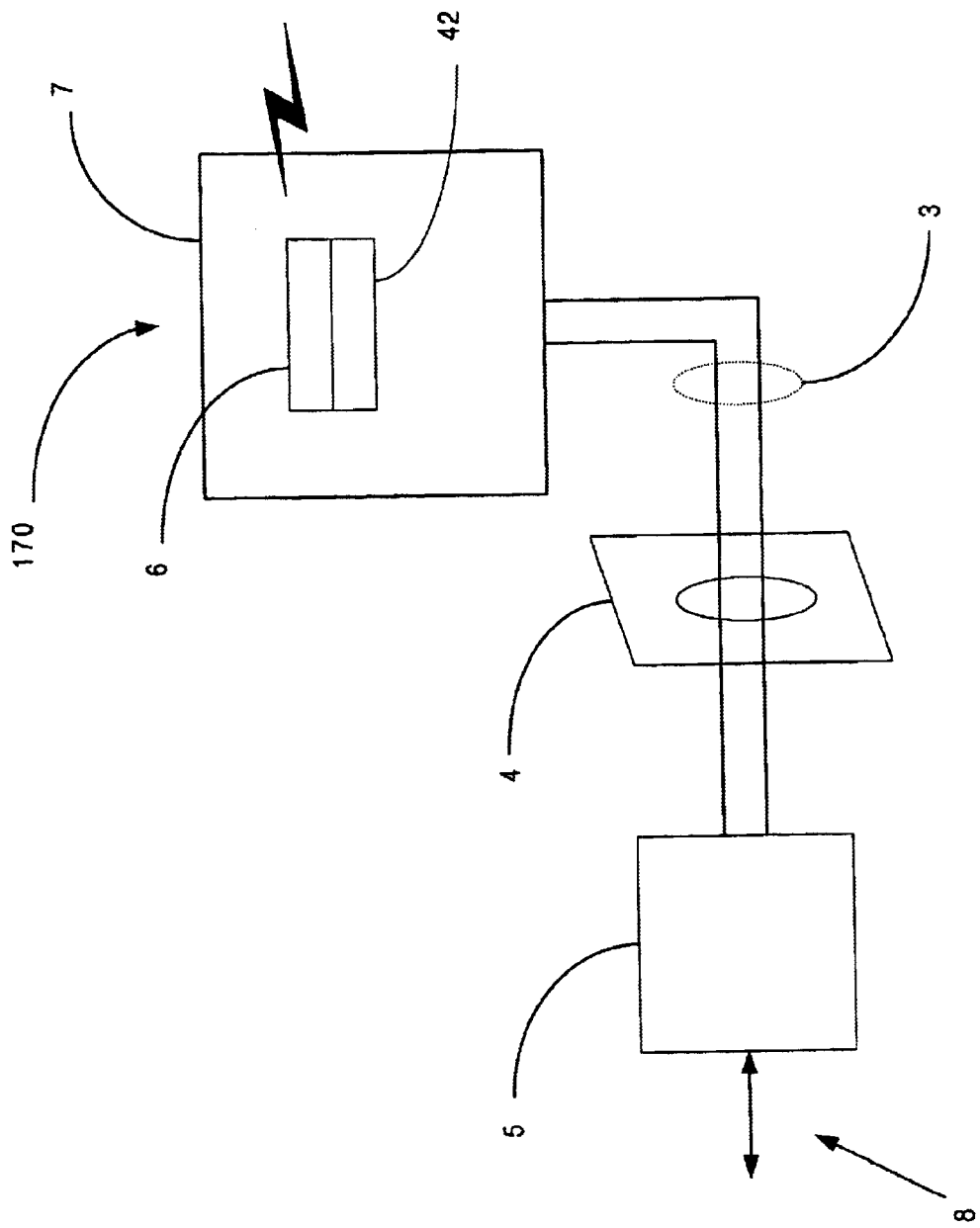
FIG. 2D illustrates a third embodiment of the subject invention.

A third embodiment 170 of the subject invention is illustrated in FIG. 2D in which, compared to previous figures, like elements are referenced with like identifying numerals. In this embodiment, electrical appliance 7 includes a module 42 which forms a repeater in combination with antenna 6. The repeater receives over the wireless interface a signal, amplifies the signal, and then retransmits it over the wireless interface, optionally at a different carrier frequency than the received frequency. Note that the repeater need not be coupled to the A/C power lines 3 for appliance 7 in this embodiment.

In this embodiment, the frequency of reception and the frequency of transmission may both be within the ISM spectrum, or both may be within the RF or microwave spectrum, exclusive or inclusive of the ISM spectrum. In addition, the frequency of reception may the same as or different from the frequency of transmission.

Figure 2E:
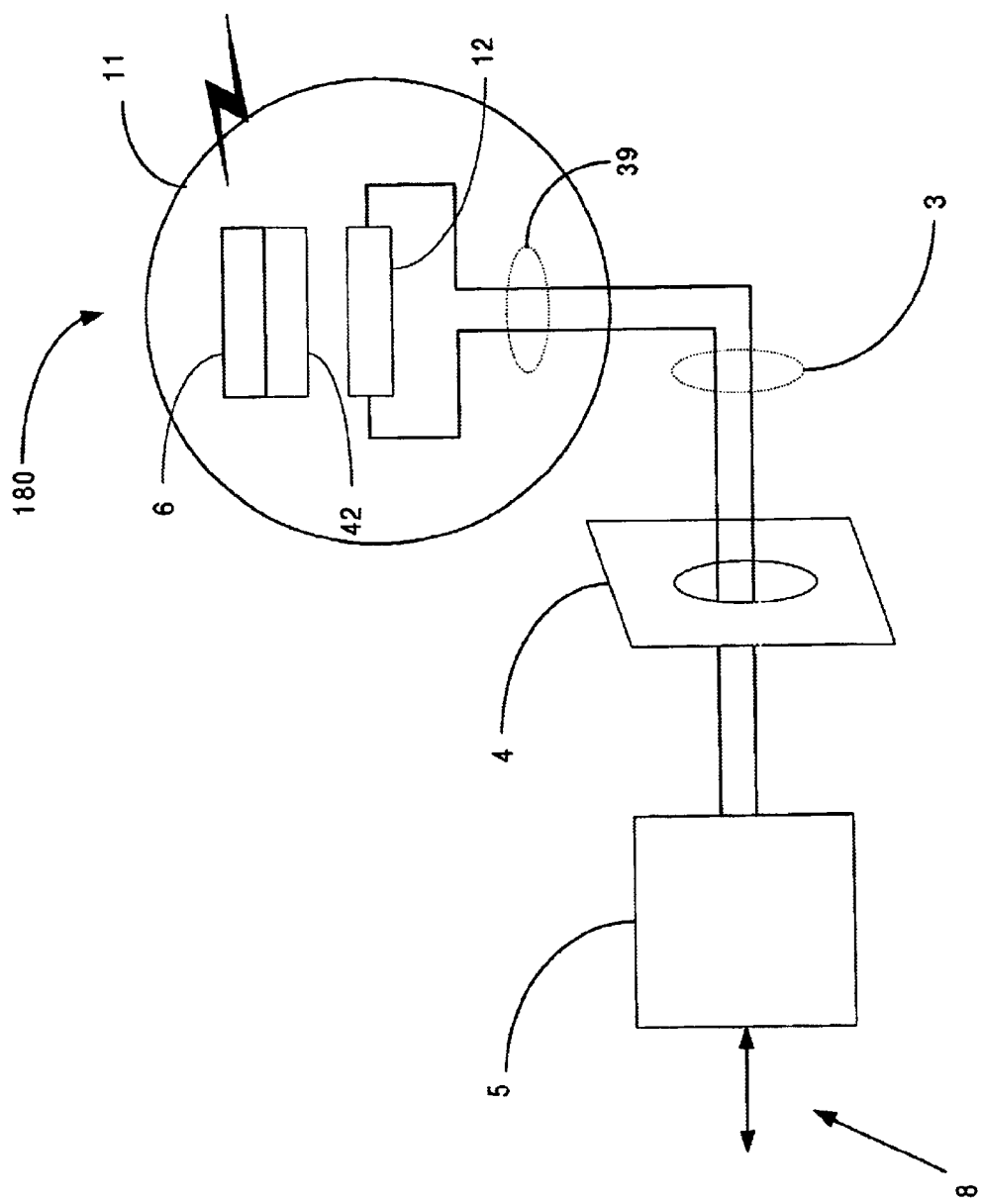
FIG. 2E illustrates an implementation of the third embodiment of the subject invention.

FIG. 2E illustrates an implementation 180 of the embodiment of FIG. 2D in which electrical appliance 7 is a light bulb 11. As shown, included in the light bulb is a repeater formed from the combination of antenna 6 and module 42.

Also included is a filament 12 coupled to the A/C power distribution system 3a of the light bulb. Note in this implementation that the repeater need not be coupled to the A/C power distribution system of the light bulb 11.

Figure 2F:
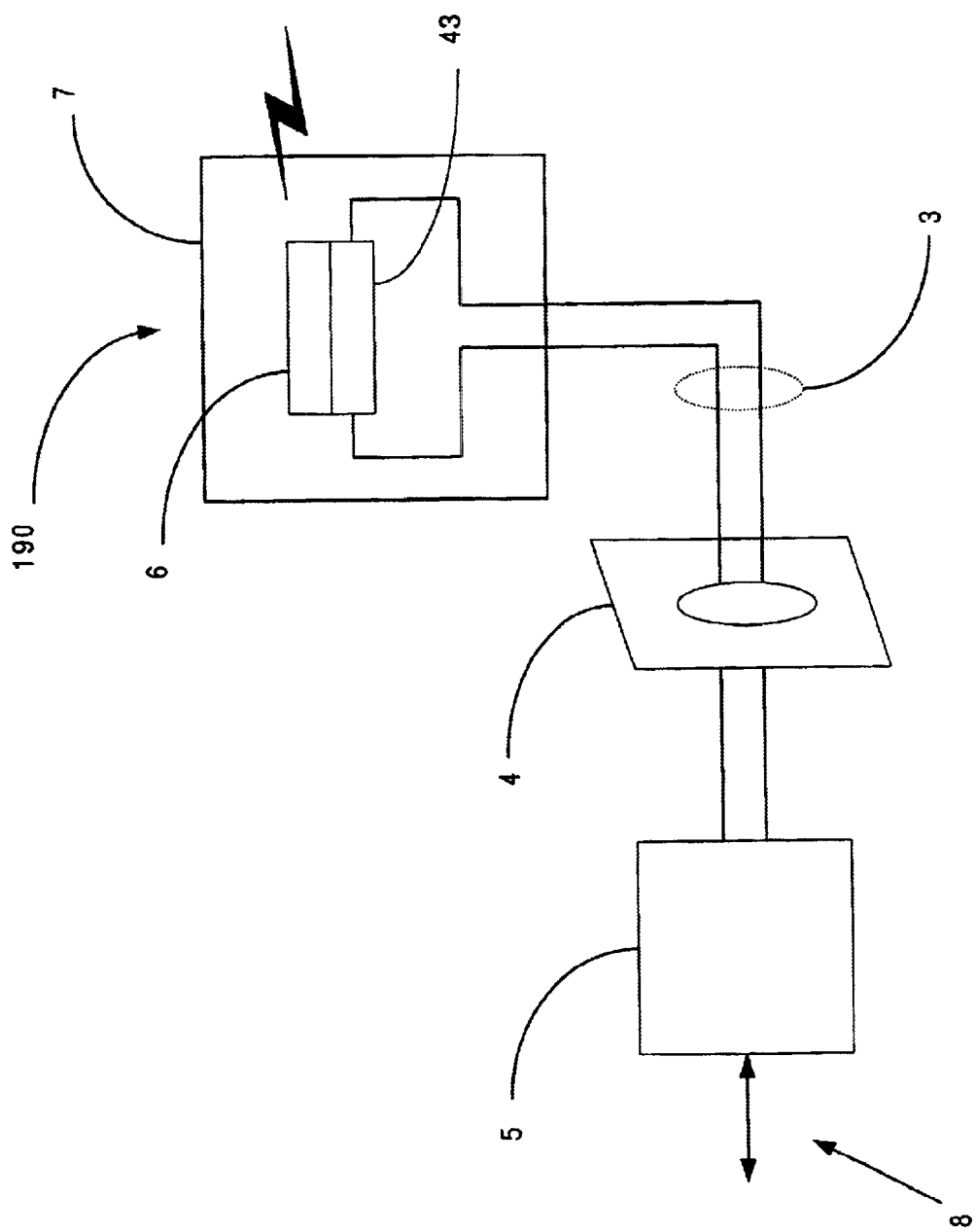
FIG. 2F illustrates a fourth embodiment of the subject invention.

FIG. 2F illustrates a fourth embodiment 190 of the subject invention in which a module 43 is included within electrical appliance 7. In this embodiment, the module 43 combines the functionality of module 41 of the embodiment of FIG. 2A, and module 42 in the embodiment of FIG. 2D. In a transceiver mode of operation, the module 43 forms a transceiver in combination with antenna 6, which functions as previously described. In a repeater mode of operation, the module 43 forms a repeater in combination with antenna 6, which functions as previously described.

In a fifth embodiment of the subject invention, any of the foregoing embodiments are configured as nodes in a wireless communications system, and any of the nodes in the wireless communications system can communicate with any other node in the system over the wireless interface.

Figure 3A:
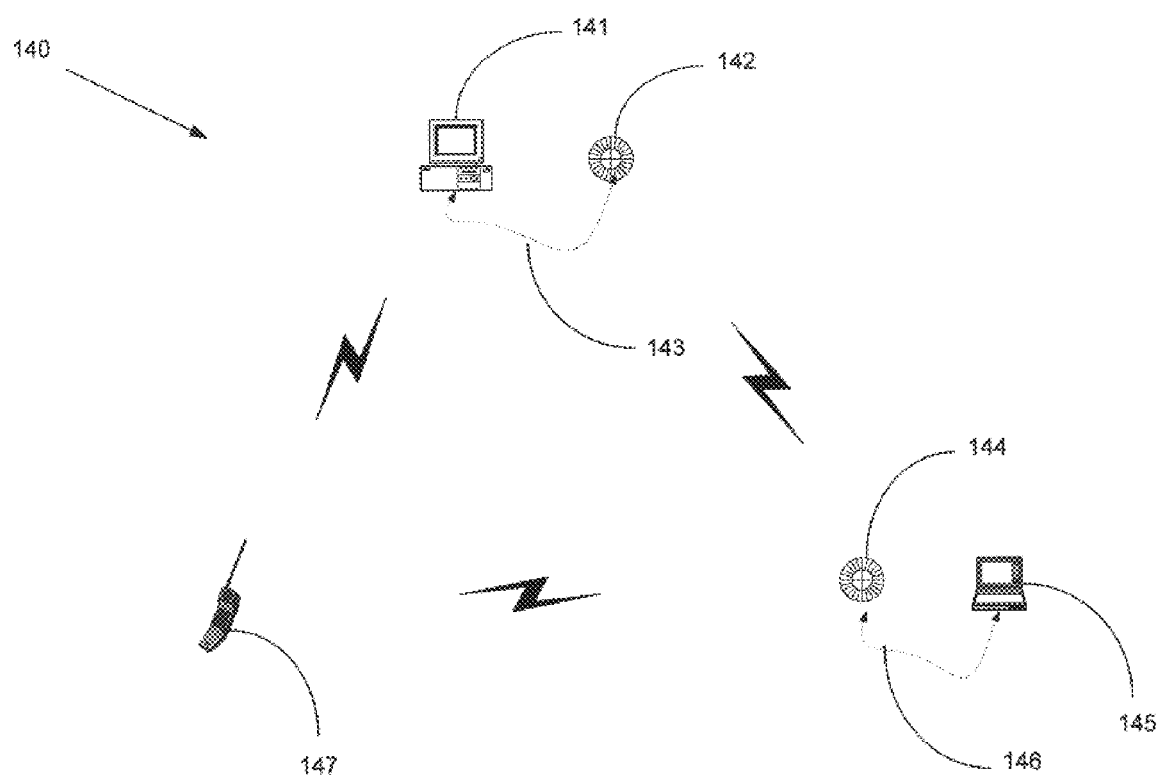
FIGS. 3A–3B illustrate implementations of a fifth embodiment of the subject invention.

An implementation 140 of such a system is illustrated in FIG. 3A. As shown, the system in this implementation comprises three nodes. The first node comprises desktop computer 141 which is interfaced to desk lamp 142 through A/C power lines 143. The lamp 142 includes a light bulb (not independently shown) configured with an antenna and optionally a transceiver in accordance with the foregoing embodiments. User information and/or commands originating from the computer 141 are transmitted to the antenna in the lamp 142 through the power distribution lines, and then out over the wireless interface to one of the other nodes. In addition, information and/or commands originating from one of the other nodes are received from the antenna in lamp 142, and transmitted to the computer 141 through A/C power transmission lines 143. As discussed, the modulation and demodulation functions may be performed within computer 141, or may be performed by a transceiver included in the light bulb of lamp 142.

A second such node is formed from light fixture 144 which is interfaced to laptop 145 over A/C power lines 146. The light bulb (not independently shown) in the light fixture 144 includes an antenna and optionally a transceiver in accordance with any of the foregoing embodiments. Again, user commands and/or information is communicated back and forth between laptop 145 and the light bulb in the light fixture 144 by means of A/C power lines 146. These commands and/or information may are also be communicated to one of the other nodes through the wireless interface.

A third node is formed of wireless handset 147 which, as is known, includes an antenna and transceiver configured to operate at the desired frequency of operation.

In one example, the system of FIG. 3A is managed through a token ring protocol in which only the node which is the current holder of the token has the right to transmit. In another example, the system forms an IEEE 802.11 compliant wireless LAN as described in www.breezecom.com, which is fully incorporated by reference herein as through set forth in full. In this example, the network is divided into cells, with a base station handling communication between any two nodes within a cell. Communications is performed using a frequency hopping protocol at frequencies of about 2.4 GHz. A carrier sense/multiple access/collision avoidance protocol is employed in which a node, prior to transmitting, senses whether the carrier is busy or not. If so, the node employs an exponentially distributed random backoff procedure to wait a random amount of time before attempting to transmit again. If not, the node transmits.

Figure 3B:
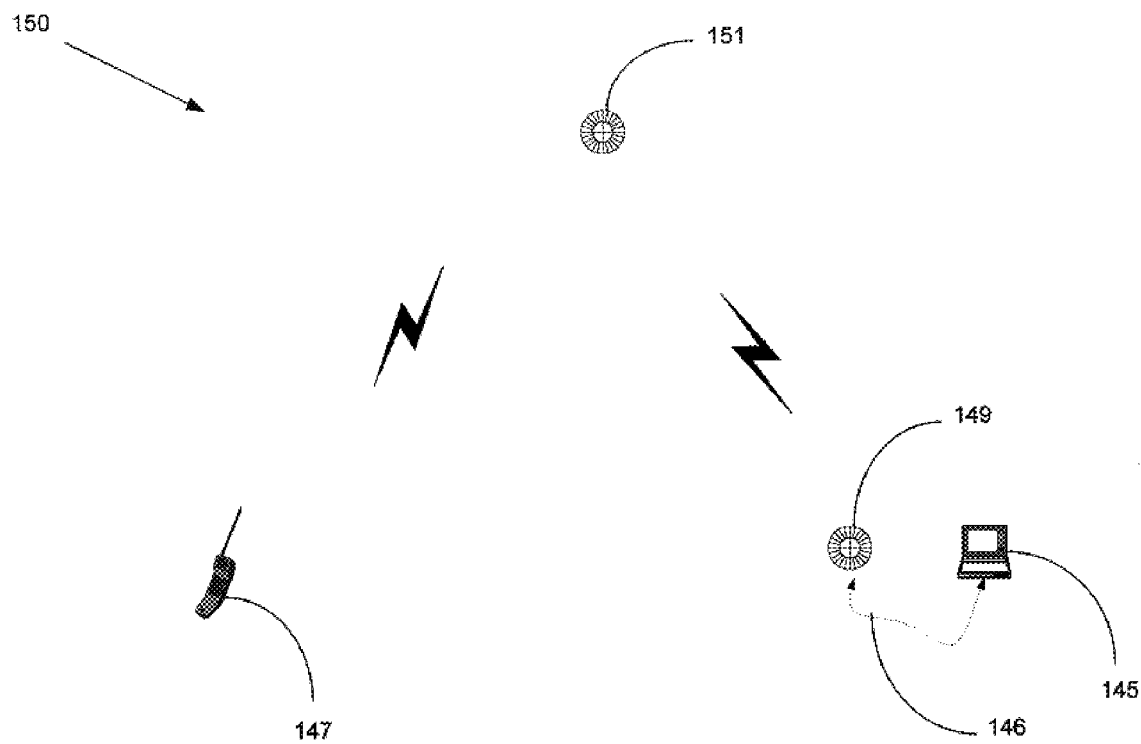

A second implementation 150 of such a system is illustrated in FIG. 3B in which, compared to FIG. 3A, like elements are referenced with like identifying numerals. In this implementation, the first node has been replaced with a light fixture 151 including a light bulb (not independently shown) configured to act as a repeater in accordance with the foregoing embodiments. In this implementation, transmissions between the other two nodes occur by way of the repeater.

Figure 3C:
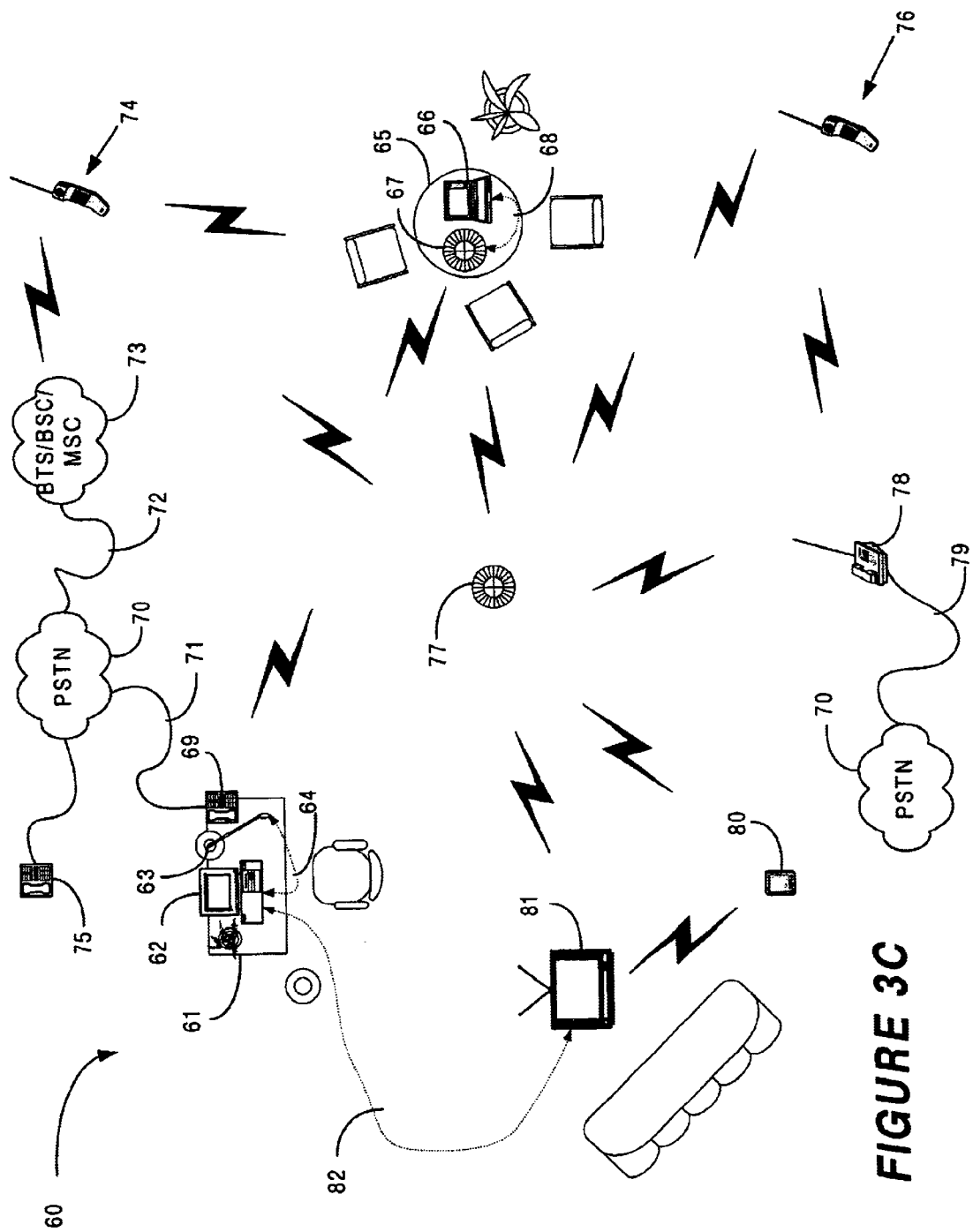
FIG. 3C illustrates an implementation example of the fifth embodiment of the subject invention.

An implementation example 60 of a wireless communications system in accordance with the fifth embodiment is illustrated in FIG. 3C. In this example, a first node comprises desktop computer 62 in combination with desk lamp 63 which is coupled to the computer 62 through A/C power lines 64. A light bulb (not independently shown) in the lamp 83 includes an antenna and optionally a transceiver configured in accordance with the subject invention. Information and/or commands originating in computer 62 may be provided to the light bulb (not independently shown) in lamp 63 over the A/C power lines 64 for transmission to another node over a wireless interface, and information and/or commands from another node may be received by the light bulb, and then provided to the computer 62 over A/C power lines 64.

A second node is formed of a landline telephone 69 which is interfaced to the Public Switched Telephone Network (PSTN) 70 through landlines 71. The second node is assumed to be at about the same location as the first node, i.e., on or about desk 61.

A third node is formed of landline phone 75 which is similarly interfaces to the PSTN 70. This phone is assumed to be remote from the first node.

A fourth node is formed of cellular handset 74 which is interfaced to a wireless infrastructure system 73 through a wireless interface. The wireless infrastructure system 73 may include one or more base station transceiver subsystems (BTS), one or more base station controllers (BSC), and one or more mobile switching systems (MTS). The wireless infrastructure system 73 is in turn interfaced to the PSTN 70 over landlines 72.

A fifth node comprises light fixture 77 which includes a light bulb (not independently shown) configured to function as a repeater in accordance with the subject invention.

A sixth node comprises desktop computer 62 in combination with television set 81. Television set 81 includes an antenna and optionally a transceiver configured in accordance with the subject invention. The television set 80 may be controlled by a remote control device 80 which is part of the sixth node. Information and/or commands originating in the computer 62 may be provided to the antenna and/or transceiver in television set 81 over A/C power lines 82 for transmission to another node, and information and/or commands from another node may be received by the antenna and/or transceiver in the television set 81, and then provided to the computer 62 over the A/C power lines 82. In addition, information and/or commands from remote control device 80 may be provided to the television set over a wireless interface. This information and/or commands may be for the purpose of controlling the television set 81 or for transmission to another node.

A seventh node comprises cordless handset 76 in combination with cordless base station 78. The handset 76 is configured to communicate with base station 78 over a wireless interface. The base station 78 in turn is interfaced to PSTN 70 through landlines 79.

An eighth node comprises laptop 66 in combination with table lamp 67 which is interfaced to the laptop 66 through A/C power lines 68. A light bulb (not independently shown) in lamp 67 includes an antenna and optionally a transceiver configured in accordance with the subject invention. Information and/or commands originating from the laptop may be provided to the light bulb through A/C power lines 68 for transmission over a wireless interface to another node, and information and/or commands originating from another node may be received by the light bulb and provided to the laptop over the A/C power lines 68.

The first, second, fifth, sixth, seventh, and eighth nodes are all assumed to be physically within the same home or office building, although they may be in different rooms of the same. The third and fourth nodes are assumed to be externally located.

In one scenario, the computer 62 in the first and sixth nodes is configured to communicate with the laptop 66 in the eighth node over a wireless interface comprising the antennas and/or transceivers in the light bulbs in lamps 63 and 67. In addition, computer 62 is configured to communicate with the laptop 66 in the eighth node over a wireless interface comprising the antennas and/or transceivers in the television set 81 and the light bulb in the lamp 67. Optionally, if the geographical distance warrants, transmissions between the television set 81 and the laptop 66 occur by means of the repeater within light fixture 77.

Voice communication may be exchanged between either of telephones 69 and 75 and handset 74 through the PSTN and the wireless interface existing between the infrastructure system 73 and the handset 74.

Voice traffic may also be exchanged between handset 74 and the laptop 66 through a wireless interface comprising the antenna and transceiver in handset 74 and the antenna and/or transceiver in the light bulb of lamp 67.

Voice communication may also be exchanged between cordless handset 76 and either of phones 69 or 75 through the wireless interface existing between the handset 76 and the base station 78, and the PSTN. Alternately, voice traffic from the handset 76 may be transmitted to either of these phones through a wireless interface comprising repeater 77 and infrastructure system 73 in combination with the PSTN. This link allows communications with the handset 76 to occur even if the handset 76 is out of range of the base station 78. Voice traffic may also be exchanged between laptop 66 (which may be equipped with a microphone and speakers) and handset 76 through a wireless link comprising the antenna and transceiver in handset 76, repeater 77, and the antenna and/or transceiver in the light bulb in the lamp 67.

Commands originating from remote control device 80 may also be provided to other nodes through repeater 77.

Figure 4A:
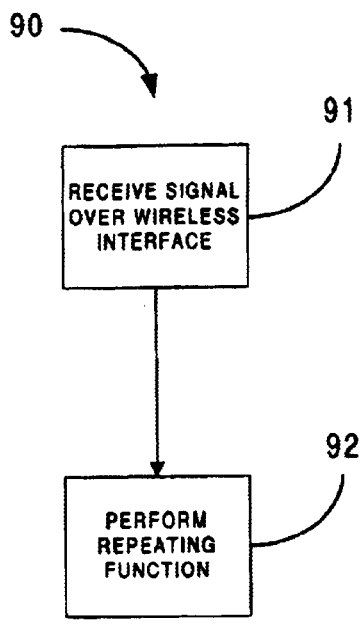
FIGS. 4A–4C, 5A–5B illustrate embodiments of methods in accordance with the subject invention.

One method of operation 90 of an electrical appliance in accordance with the subject invention is illustrated in FIG. 4A. In step 91, a signal is received over a wireless interface. In one implementation, the signal has a carrier frequency within the ISM spectrum. In another implementation, the carrier frequency is within the RF or microwave spectrum, either inclusive or exclusive of the ISM spectrum.

In step 92, a repeating function is performed in which the signal is retransmitted, optionally after being amplified and optionally after adjusting the carrier frequency of the signal. In one implementation, the carrier frequency of the received signal is within the RF or microwave spectrum, exclusive of the ISM spectrum, and the carrier frequency of the retransmitted signal has been adjusted to be within the ISM spectrum. In one implementation example, the carrier frequency of the retransmitted signal is unchanged in relation to that of the received signal. In a second implementation example, the carrier frequency of the retransmitted signal has been adjusted in relation to that of the received signal. In a third implementation example, the carrier frequency of the received signal is within the ISM spectrum, and the carrier frequency of the retransmitted signal has been adjusted to be within the RF spectrum exclusive of the ISM spectrum.

Figure 4B:
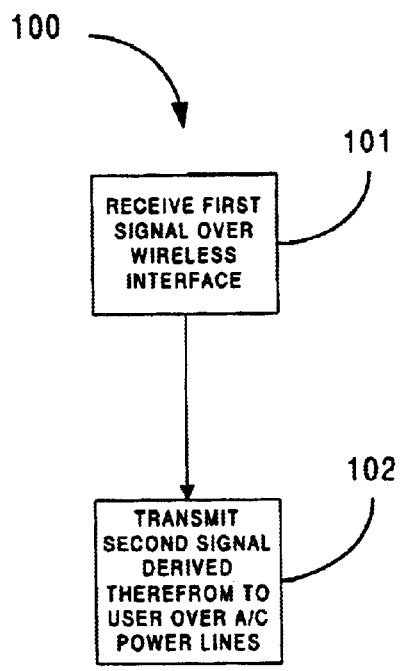

FIG. 4B illustrates a second method of operation 100 of an electrical appliance in accordance with the subject invention. In step 101, a first signal is received over a wireless interface from a signal source which may be a node in a system, a wireless or personal communication device, a mobile or subscriber device, a cellular handset, a cordless handset or base station, a processor, a laptop, a desktop computer, etc. Again, the carrier frequency of the signal may be within the ISM spectrum, or it may be within the RF or microwave spectrum, inclusive or exclusive of the ISM spectrum.

In step 102, a second signal derived from the first signal is provided to a user over the A/C power lines or A/C power distribution system of the device. In one implementation, the second signal is the first signal. In another implementation, the second signal is different from the first signal.

Figure 4C:
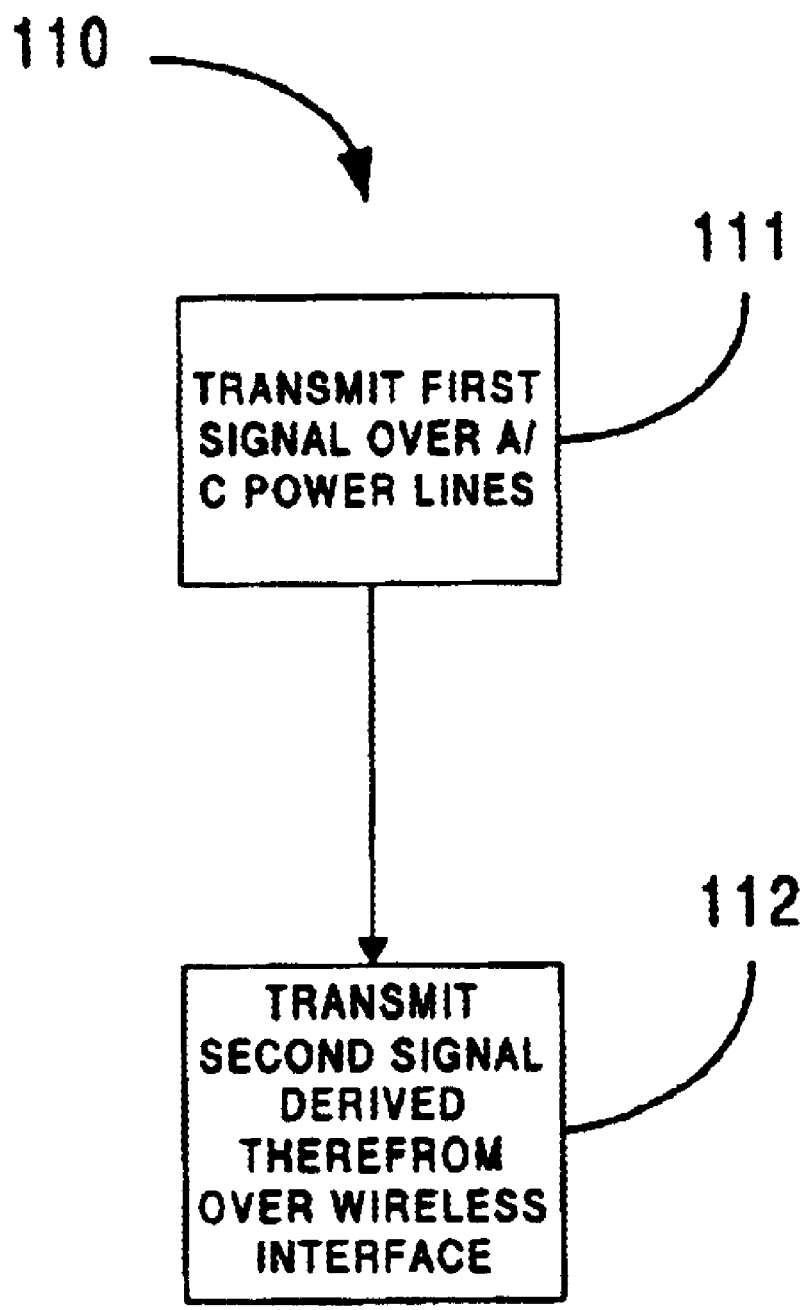

FIG. 4C illustrates a third method of operation 110 of an electrical appliance in accordance with the subject invention. In step 111, a first signal is providedover the A/C power transmission lines or A/C power distribution system of an electrical appliance. The carrier frequency of the signal may be within the ISM spectrum, or it may be within the RF or microwave spectrum, inclusive or exclusive of the ISM spectrum.

In step 112, a second signal derived from the first signal is transmitted over a wireless interface to a signal destination which may be a node in a system, a wireless or personal communication device, a mobile or subscriber device, a cellular handset, a cordless handset or base station, a processor, a laptop, a desktop computer, etc.

In one implementation, the second signal is the first signal; in a second implementation, the second signal is different from the first signal.

Figure 5A:
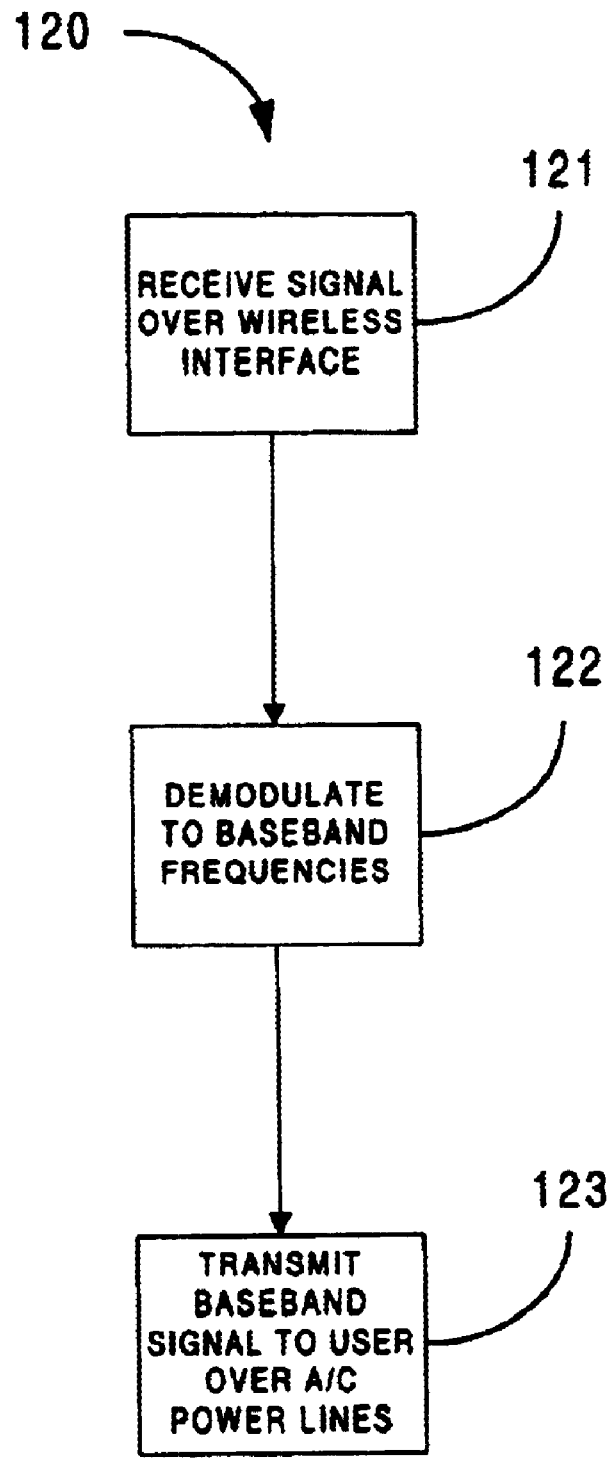

FIG. 5A illustrates a fourth method of operation 120 of an electrical appliance configured in accordance with the subject invention. In step 121, a signal is received over a wireless interface with a signal source. Again, the carrier frequency of the signal may be within the ISM spectrum, or the RF or microwave spectrum, inclusive or exclusive of the ISM spectrum.

In step 122, the signal is demodulated to baseband frequencies. Optionally, additional steps may also be performed, including bandlimiting, amplifying, or low-pass filtering steps.

In step 123, the baseband signal is transmitted to a user over the A/C power lines or A/C power distribution system of the electrical appliance.

Figure 5B:
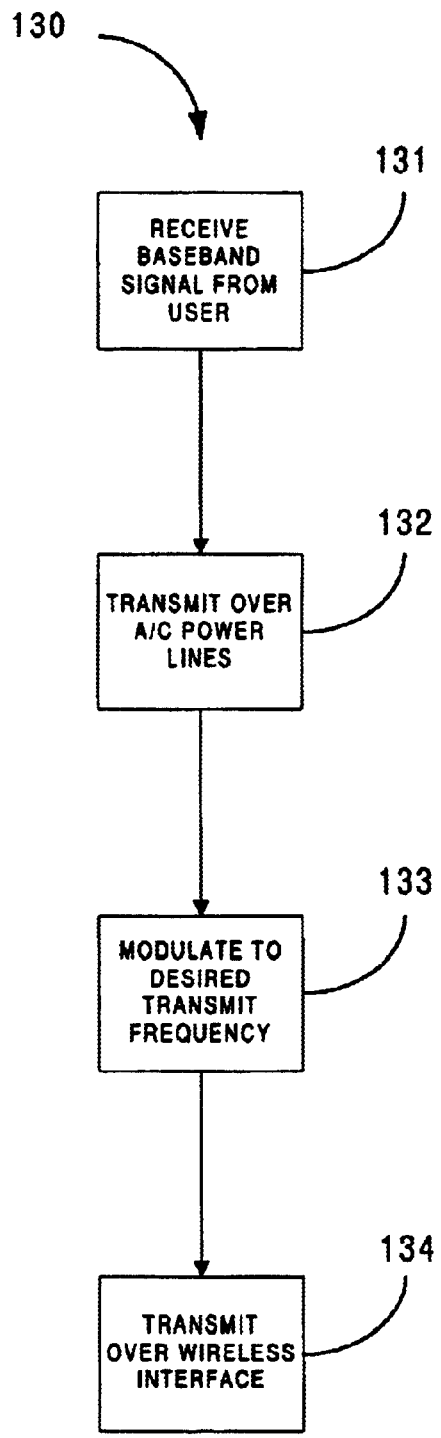

FIG. 5B illustrates a fifth method of operation of an electrical appliance configured in accordance with the subject invention. In step 131, a signal at baseband frequencies is received from a user. In step 132, the signal is transmitted over the A/C power distribution lines or power distribution system of the electrical appliance to a modulator located within the electrical appliance. In step 133, a carrier signal at a desired transmit frequency is modulated with the baseband signal. The carrier frequency may be within the ISM spectrum, or it may be within the RF or microwave spectrum, inclusive or exclusive of the ISM spectrum.

Optionally, additional processing is performed on the signal, including bandlimiting, amplifying, or filtering steps. In step 134, the modulated signal is transmitted over the wireless interface.

While embodiments, implementations, and implementation examples of the subject invention have been shown and described, it should be appreciated by one of skill in the art that many more embodiments, implementations, and implementation examples are within the scope of the subject invention. Accordingly, the subject invention is not to be limited except in light of the appended claims and their equivalents.

What is claimed is:

1. A light bulb configured to provide a wireless interface for a user device, said user device being connected to said light bulb via a power line capable of carrying a data signal superimposed upon a power signal, said light bulb comprising:
   a bulb;
   a filament within said bulb, wherein said filament is coupled to said power line, and wherein said filament is illuminated by said power signal;
   an antenna coupled to said power line; and
   a contact for connecting said power line to said filament and said antenna;
   wherein said antenna receives a user data signal from said user device via said power line, and wherein said antenna transmits said user data signal wirelessly.

2. The light bulb of claim 1, wherein said antenna is within said bulb.

3. The light bulb of claim 1, wherein said antenna is outside of said bulb.

4. The light bulb of claim 1 further comprising a transceiver, wherein said user data signal is a baseband signal, and wherein said transceiver modulates said baseband signal prior to transmission by said antenna.

5. The light bulb of claim 1, wherein said light bulb receives a remote data signal wirelessly from a remote device and transmits said remote data signal superimposed upon said power signal to said user device via said power line.

6. The light bulb of claim 5 further comprising a transceiver, wherein said remote data signal is a baseband signal, and wherein said transceiver demodulates said baseband signal after wireless reception of said remote data signal by said antenna.

7. The light bulb of claim 1, wherein said user data signal is a modulated signal.

8. A light bulb configured to provide a wireless interface for a user device, said user device being connected to said light bulb via a power line capable of carrying a data signal superimposed upon a power signal, said light bulb comprising:
   a bulb;
   a filament within said bulb, wherein said filament is coupled to said power line, and wherein said filament is illuminated by said power signal;
   a repeater coupled to said power line; and
   a contact for connecting said power line to said filament;
   wherein said repeater receives a user data signal, and wherein said repeater transmits said user data signal wirelessly.

9. The light bulb of claim 8, wherein said repeater is within said bulb.

10. The light bulb of claim 8, wherein said repeater is outside of said bulb.

11. An electrical apparatus adapted to connect to a light bulb socket and provide a wireless interface for a user device, said user device being connected to said electrical apparatus via a power line capable of carrying a data signal superimposed upon a power signal, said electrical apparatus comprising:
    a bulb;
    an antenna within said bulb; and
    a contact coupled to said bulb, wherein said contact connects said power line to said antenna;
    wherein said antenna receives a user data signal from said user device via said power line, and wherein said antenna transmits said user data signal wirelessly.

12. The electrical apparatus of claim 11 further comprising a transceiver, wherein said user data signal is a baseband signal, and wherein said transceiver modulates said baseband signal prior to transmission by said antenna.

13. The electrical apparatus of claim 11, wherein said electrical apparatus receives a remote data signal wirelessly from a remote device and transmits said remote data signal superimposed upon said power signal to said user device via said power line.

14. The electrical apparatus of claim 13 further comprising a transceiver, wherein said remote data signal is a baseband signal, and wherein said transceiver demodulates said baseband signal after wireless reception of said remote data signal by said antenna.

15. The electrical apparatus of claim 11, wherein said user data signal is a modulated signal.

16. An light bulb adapted to connect to a power line connector and provide a wireless interface for a user device, said user device being connected to said light bulb via a power line capable of carrying a data signal superimposed upon a power signal, said light bulb comprising:
    an antenna; and
    a contact coupled to said antenna, wherein said contact connects said power line to said antenna;
    wherein said light bulb receives a remote data signal from a remote device wirelessly via said antenna and transmits said remote data signal superimposed upon said power signal to said user device via said power line.

17. The light bulb of claim 16 further comprising a transceiver, wherein said remote data signal is a baseband signal, and wherein said transceiver demodulates said baseband signal after reception by said antenna.

18. The light bulb of claim 16, wherein said antenna receives a user data signal from said user device via said power line and transmits said user data signal wirelessly.

19. The light bulb of claim 18 further comprising a transceiver, wherein said user data signal is a baseband signal, and wherein said transceiver modulates said baseband signal prior to transmission of said baseband signal wirelessly.

20. The light bulb of claim 18, wherein said user data signal is a modulated signal.

21. The light bulb of claim 16, wherein said power signal powers on said light bulb and said user device.

* * * * *